United States Patent [19]

Smith

[11] 4,009,106
[45] Feb. 22, 1977

[54] CLARIFIER WITH OVERFLOW SCUM REMOVAL

[75] Inventor: George W. Smith, Waukesha, Wis.
[73] Assignee: Envirex Inc.
[22] Filed: June 18, 1975
[21] Appl. No.: 588,114
[52] U.S. Cl. .......................... 210/195 S; 210/537; 210/540
[51] Int. Cl.² ........................................ B01D 21/10
[58] Field of Search .......... 210/525, 540, 537, 513, 210/195 S, 195 SO

[56] References Cited

UNITED STATES PATENTS

| | | | |
|---|---|---|---|
| 2,076,529 | 4/1937 | Durdin | 210/540 |
| 2,103,796 | 12/1937 | Seip | 210/525 |
| 2,963,430 | 12/1960 | Schreiber | 210/540 |
| 3,118,834 | 1/1964 | Southworth et al. | 210/195 S |
| 3,219,189 | 11/1965 | Moore | 210/195 S |
| 3,448,861 | 6/1969 | Berk | 210/525 |
| 3,534,857 | 10/1970 | Berk | 210/525 |
| 3,733,263 | 5/1973 | Mandt | 210/195 S |
| 3,744,634 | 7/1973 | Schlenz | 210/525 |

FOREIGN PATENTS OR APPLICATIONS 1,459,510  9/1971  Germany .................. 210/195 S

*Primary Examiner*—Tim R. Miles
*Assistant Examiner*—Gregory N. Clements
*Attorney, Agent, or Firm*—Sughrue, Rothwell, Mion, Zinn & Macpeak

[57] ABSTRACT

The center clarifier of an endless channel type activated sludge sewage treatment plant is provided with a steep conical floor, a conical baffle and a circular effluent launder. The upper periphery of the baffle includes an overflow trough to receive the scum which is allowed to collect between the trough and the tank wall. The feed to the clarifier is directed through a circular series of spaced submerged ports in the tank wall and toward the conical baffle below the scum collection zone to promote and allow separation of the scum which is removed by overflowing into the scum trough.

10 Claims, 4 Drawing Figures

CLARIFIER WITH OVERFLOW SCUM REMOVAL

BACKGROUND OF THE INVENTION

One type of activated sludge sewage treatment plant combines several contiguous, endless aeration channels surrounding a single or several clarifiers. Raw waste, after screening and optional grit removal, is introduced into the first aeration channel where it is rapidly mixed into the system and circulated by rotating aeration discs. Besides mixing, the aeration discs supply the necessary oxygen for the activated sludge process. Although the aeration channels are complete mix systems, premature exiting of portions of the raw waste (resulting in lower BOD removal efficiencies) is prevented with two or more of the channels in series and with their transfer port located nearly full-circle from the feed to the first channel. Mixed liquor from the innermost aeration channel is usually introduced directly into the central final clarifier by a pipe or port which is similarly nearly full-circle from the transfer port.

This type of sewage treatment plant can particularly provide relatively economic but consistently high quality treatment in the flow range of 50,000 gpd to 350,000 gpd. In such plants the several endless aeration channels are circular and with the clarifier form one concrete structure. However, in the small sewage treatment plant the hydraulic design of the clarifier can become more critical than the organic load design and certain considerations are especially important in the design of the clarifier where the fluctuation of flow is great. As is known but not often noted in the design of small sewage treatment plants, the hydraulic design and the organic load design should be independent of each other. This is by comparison with the typical municipal treatment plant where the peak flows are from the ground runoff after a storm and add relatively little to the organic load. Heretofore, the usual clarifier has not been flexible or simple in operation, nor economical to build or to operate and will not give the utmost in treatment efficiency. The final clarifier in such a plant should provide a controlled flow pattern for optimum physical separation of solids at variable flow conditions, all at a minimum of capital costs. In particular also, an exceptionally simple means of scum removal from the clarifier must be provided.

An object of the present invention is to provide a completely non-mechanized clarifier with a minimum influent disturbance of the sludge blanket and with practically no flow short-circuiting.

SUMMARY OF THE INVENTION

A frusto-conical baffle in the final clarifier is disposed to promote separation of the scum so that it is not carried into the effluent and provides a controlled flow pattern to prevent short circuiting under widely varying hydraulic conditions. The baffle aids in the separation of the lighter solids in these two ways: (1) as the liquid passes around the lower periphery of the baffle, the change in direction separates the larger masses of sludge flow by inertia; (2) as the liquid rises inside the conical baffle to the peripheral effluent launder, the cross-sectional area of the clarification zone increases and the decreasing flow velocity promotes the separation of the finer solids.

The conical shape of the baffle allows scum and floating material to rise to a narrow zone around the periphery of the clarifier. Accumulated scum is removed by raising the liquid level of the clarifier and allowing the scum to enter a fixed scum trough. The finer solids settling on the baffle descend along the baffle and agglomerate and descend through the upward flow to the settling zone defined by the conical floor of the clarifier.

DESCRIPTION OF THE PREFERRED EMBODIMENT SHOWN IN THE DRAWINGS

Figure 1:
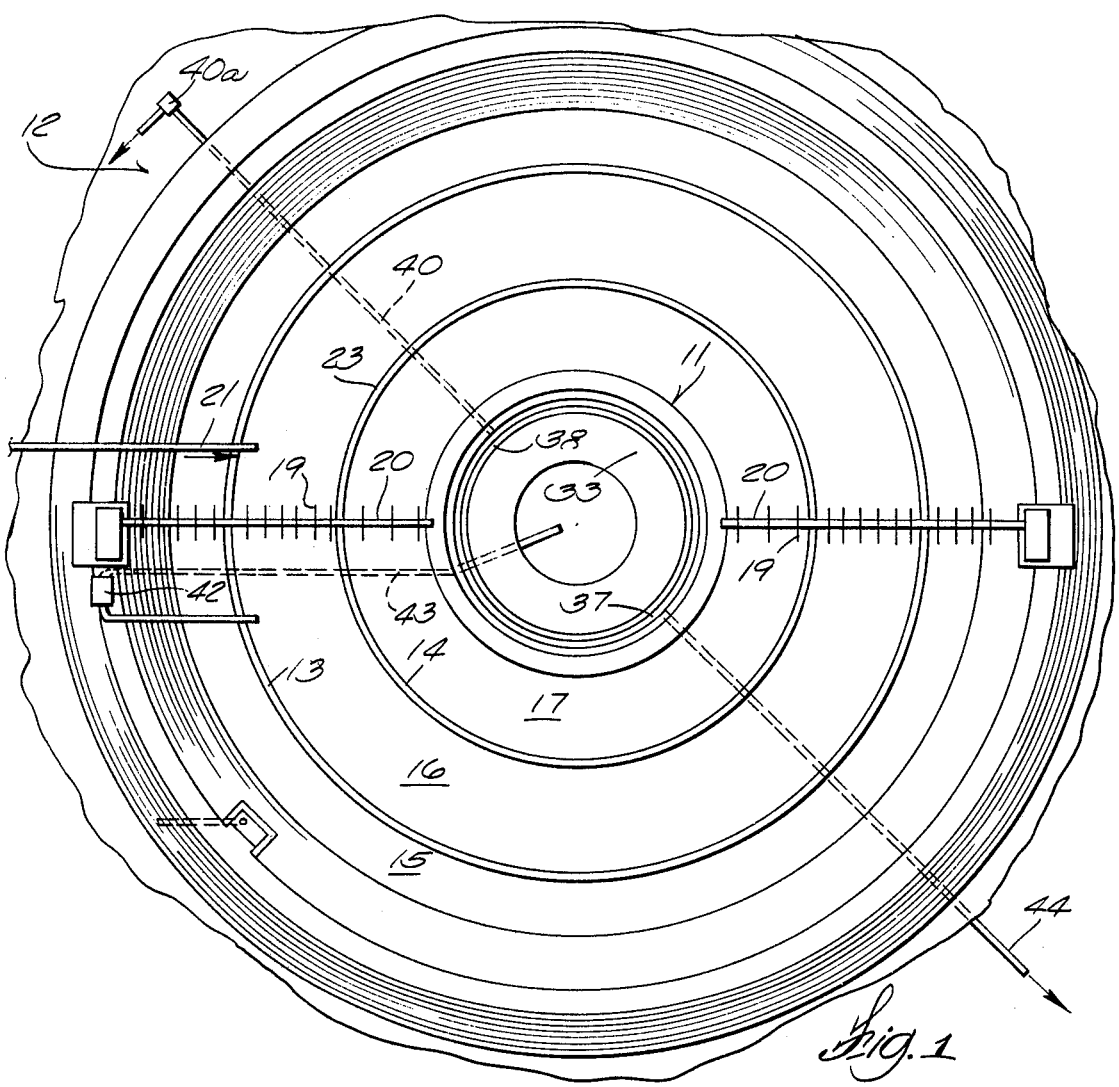
FIG. 1 shows in plan the entire sewage treatment plant with an outer aerobic digester channel.
Figure 2:
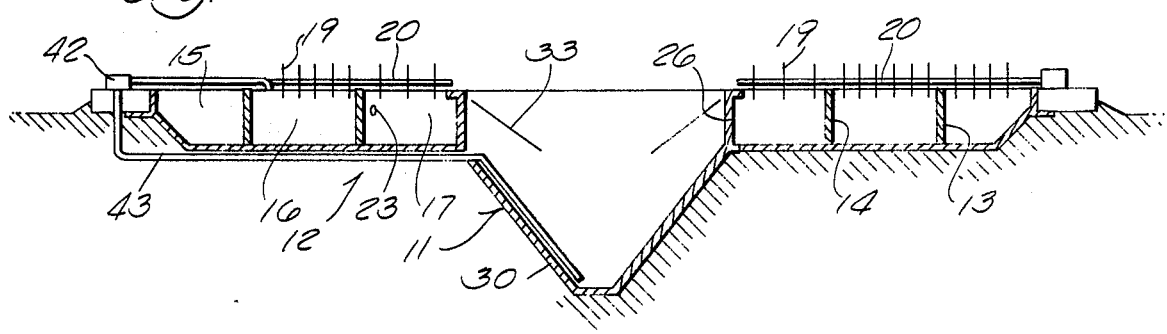
FIG. 2 is a vertical cross-section through the center of the plant.
Figure 3:
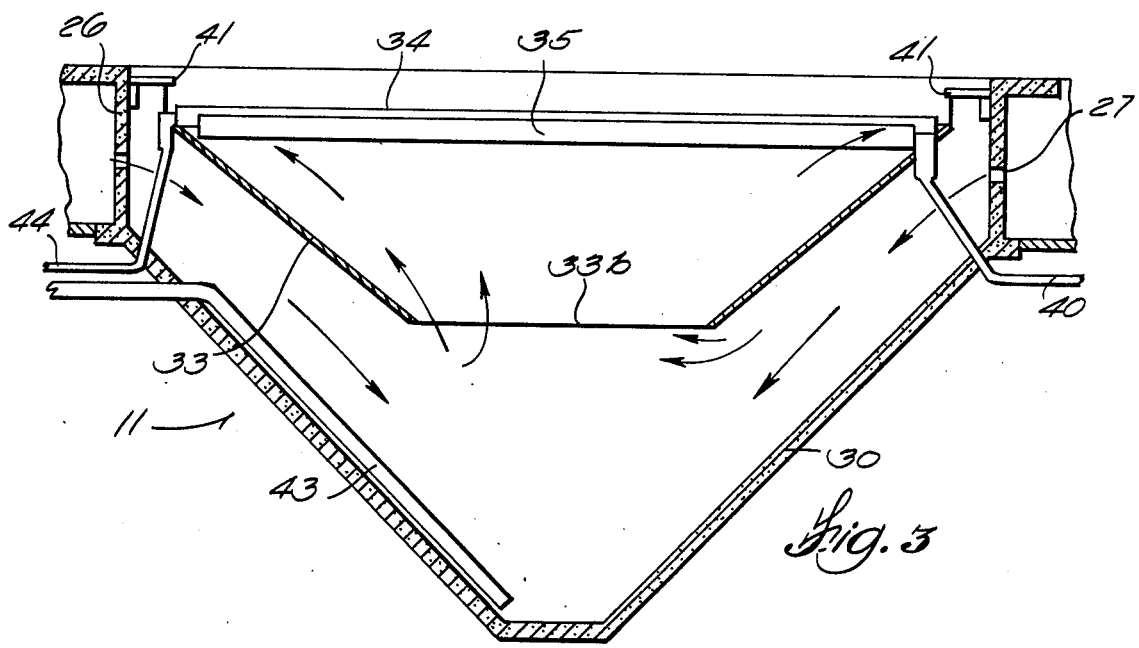
FIG. 3 is an enlarged vertical cross-section of the upper part of the final clarifier of the plant.
Figure 4:
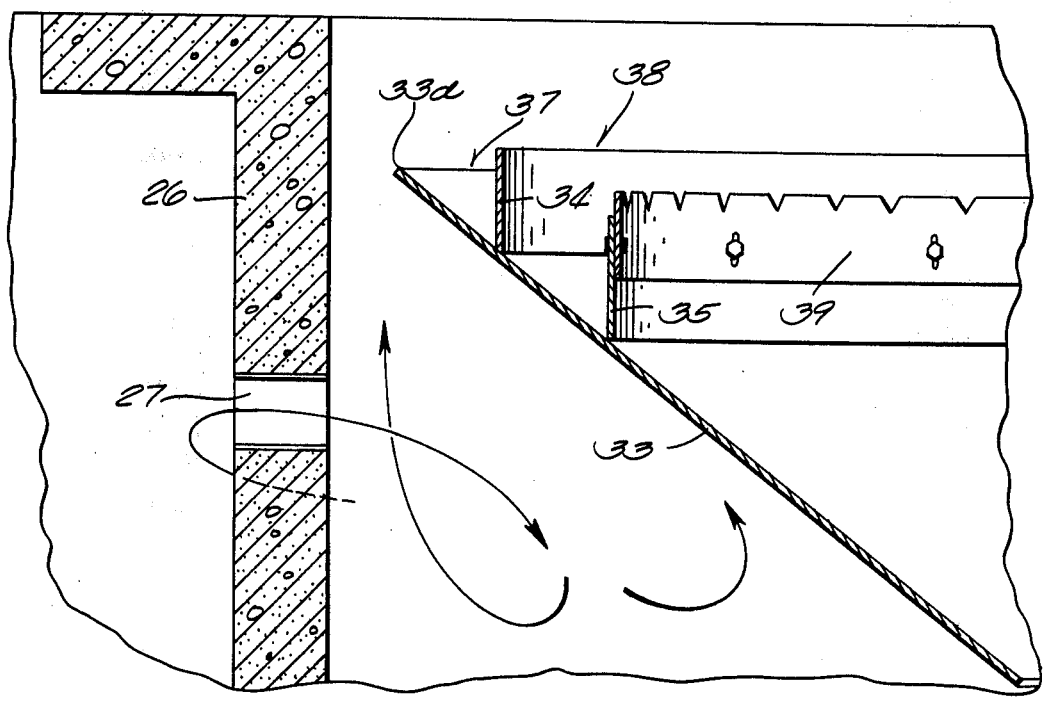
FIG. 4 is a further enlarged vertical section through one of the inlet ports of the final clarifier of the plant.

The sewage treatment plant shown in the drawings includes the clarifier 11 of reinforced concrete construction and the surrounding concrete lined circular basin 12 having a sloped outer wall. The upright concentric walls 13 and 14 of block construction divide basin 11 into the outer aerobic digestion channel 15, the intermediate first aeration channel 16 and the inner second aeration channel 17. The contents of channels 15, 16 and 17 may be aerated by any suitable means including for example and as shown, the axially spaced partially submerged discs 19 fixed to and rotated by the rotating shafts 20. Discs 19 also mix the contents of each channel and keep it in constant circulation throughout.

The influent line 21 extends over channel 15 and opens directly into channel 16. The aerated sewage is circulated counter clockwise as shown and passes through a submerged transfer port in wall 14 as at 23 where it is nearly full circle from the influent line 21 to reduce any shortcircuiting. The contents of channel 17 is similarly aerated but to a lesser degree in accordance with the reduced requirements of the system. The contents of channel 17, however, has a similar circular velocity and is also always well mixed. The velocity referred to is, of course, the minimum which will keep all the solids in suspension and prevent any from settling out in either channel. This minimum velocity is usually in the order of 1½ feet (45 cm) per second.

Wall 26 of channel 17 forms the outside wall of clarifier 11 and the treated mixed liquor is introduced into clarifier 11 through a number of submerged ports 27 formed in wall 26. The clarifier 11 is provided also with a relatively steep conical floor 30 which defines the sludge collection zone of the clarifier.

The structure supported within the clarifier 11 comprises the frusto-conical baffle 33 and the two circular upright walls 34 and 35 which with the baffle form scum trough 37 at the upper outer periphery of the baffle and the inwardly adjoining effluent launder 38.

Wall 35 includes the notched weir plate 39 which determines the liquid level in channels 16 and 17 as well as in clarifier 11. The effluent normally flows in either direction around the launder 38 to the effluent discharge line 40. The wall 34 extends some distance above the outer periphery of the baffle 33. Baffle 33 is suitably supported as by the brackets 41 for vertical adjustment particularly so that its upper outer periphery of lip 33a may be set at a uniform elevation such that the scum similtaneously overflows the lip 33a over its entire perhiphery as will be further described. The notched weir plate 39 over which the effluent passes is also vertically adjustable.

Economical construction and operation are combined in the type of plant shown. The clarifier 11 has no mechanical components whatever. The discs 19 are driven constantly at a selected speed and keep the contents of channels 15, 16 and 17 aerated and mixed and in suspension at all times. The bacterial activity in the channels is such that sudden organic loadings are tolerated. The return sludge pump 42 withdraws sludge through line 43 from the lowermost part of the sludge collection zone at a constant rate which is generally about 50% of the peak flow into the plant. General maintenance should not require more than one hour per day. Scum removal, as will be described, the removal of some waste sludge to the aerobic digestion channel and decanting as at 44 might be effected once a week. The scum from trough 38 is discharged through line 44 to whatever disposal means is provided.

According to the present invention, the channel 17 which surrounds clarifier 11 uniquely provides the required peripheral distribution of the feed to the clarifier through the ports 27. The number and diameter of the ports should be such that the velocity through the ports is as low as possible without allowing any settling in and clogging of the ports. A velocity in the order of 0.8 feet (24 cm) is typical. The ports 27 are also located between 1 foot (30 cm) and 2 feet (61 cm) below the liquid level of the clarifier. A scum collection zone is provided between wall 26 and baffle 33 above ports 27 with an upper exposed surface which should be a relatively small area. That is, the periphery or lip 33a of baffle 33 is in the order of 6 inches (15 cm) or less from wall 26.

The space between floor 30 and baffle 33 below ports 27 define a scum and sludge separation zone. The velocity front across this space has a velocity downward at peak flows which is in the order of 0.2 feet (6 cm) per minute and such that the scum has no difficulty in separating upwardly from this downward flow. Most of such separated scum, of course, rises to the underside of baffle 33 which with respect thereto functions as a plate of a plate separator.

Eight ports 27 are provided and are about three feet (0.91 m) apart. It is understood, of course, that the maximum downward velocity under baffle 33 is directly opposite each port 27 and a similarly minimum downward velocity is between the ports. It is therefore understood as well that the scum will essentially rise between the flow from the ports in approaching the scum collection zone above the ports. The amount of sludge returned through line 43 has been mentioned and is included in the downward flow between floor 30 and baffle 33 of the clarifier. As the flow approaches the lower lip 33b of baffle 33, the fraction with the heavier solids continue downward and only the finer solids are carried around the lower periphery 33b with the remainder of the flow.

The opening defined by the diameter of the lower periphery 33b of baffle 33 should be about one half the diameter of the upper periphery of lip 33a and should define an area which allows a sufficiently low upward velocity for the remainder referred to.

In the clarification zone above baffle 33, the finer solids settle out and generally descend to the top side of baffle 33 on which they collect such as in a plate separator and move downwardly through the lower opening in the baffle. The liquid approaching weir plate 39 is thus clarified and suitable as the plant effluent.

In the type of plant shown, most greases and other floatable organics are biologically removed and the remainder is generally not of great volume; the accumulated remaining scum nonetheless presents the usual problems unless removed before it presents an odor problem.

Generally the scum which collects from day to day will only gradually extend around the entire exposed surface between wall 26 and baffle 33. Several days or even up to 2 weeks may be allowed and it is here noted that the small exposed area generally prevents th drying-out of the scum which is sometimes normal over such an extended period.

Scum removal, when it is required, is simply and quickly effected merely by closing or partially closing the effluent line 40 such as with the valve 40a. In consequence, of course, the effluent launder 38 is first flooded. The liquid level within the clarifier 11 then rises gradually.

Clarifier 11 and channels 16 and 17 are hydraulically connected and thus, the rate of rise of the liquid in the clarifier is particularly retarded so that the scum overflowing lip 33a of baffle 33 occurs at a very deliberate rate which can be observed and readily controlled by a single operator. If the scum which overflows lip 33a flows easily in scum trough 37 to the discharge line 44, the valve 40a can be opened immediately thereafter where a minimum of dilution water is desired. The disposition of the removed scum must, of course, be provided for and it may possibly be pumped into the aerobic digestion channel 15. In any case, of course, the flow into clarifier 11 through ports 27 will cause the same amount of separated feed (less the amount returned through line 43) to overflow the lip 33a and flush the scum from trough 37. As this is completed, valve 40a is then reopened and normal operation of the clarifier will automatically resume.

I claim:
1. A sewage treatment clarifier comprising
   1. a circular outer wall having a series of submerged ports through which the feed is introduced into the clarifier,
   2. a steep conical bottom defining a lower sludge collection zone,
   3. a sludge return line from the lowermost portion of said zone,
   4. a circular overflow launder which establishes the normal liquid level within the clarifier and which includes a valve-controlled effluent line from said launder,
   5. a circular scum trough between said launder and said wall and extending above said liquid level and having a withdrawal pipe from said trough,
   6. a frusto-conical baffle having its larger periphery upward and spaced from said wall and above said ports, the underside of said baffle and said wall defining therebetween a scum collection zone above said ports and a scum and sludge separation zone below said ports, said scum trough being disposed adjacent to said scum separation zone closing of said effluent line and nominal raising of the liquid level within the clarifier is effective to lift the scum so that it overflows into the scum trough from which it is then discharged.

2. The clarifier of claim 1 wherein the upper side of the baffle defines a clarification zone extending to the liquid level within the tank and the lower periphery of the baffle defines the entry to said zone.

3. The clarifier of claim 1 wherein the elevation of the baffle and scum trough is adjustable and the overflow launder includes a vertically adjustable weir.

4. The clarifier of claim 1 wherein the baffle, the scum trough and the overflow launder form a unitary structure which is suspended within the tank.

5. The clarifier of claim 4 wherein the structure is vertically adjustable and the effluent launder includes a weir plate which is vertically adjustable.

6. A sewage treatment clarifier comprising
   1. a circular outer wall having a series of ports through which the feed is introduced into the clarifier,
   2. a steep conical bottom defining a lower sludge collection zone,
   3. a sludge return line from the lowermost portion of said zone,
   4. a circular overflow launder which establishes the normal liquid level within the clarifier and which includes a valve-controlled effluent line from said launder,
   5. a circular scum trough between said launder and said wall and extending above said liquid level and spaced from said wall and having a withdrawal pipe from said trough,
   6. a frustoconical baffle extending downwardly and inwardly from said trough and twoard said zone, said ports in said wall opening generally in the direction of said baffle, the underside of said baffle and said wall defining therebetween a scum collection zone above said ports and a scum and sludge separation zone below said ports, said scum trough being disposed so that periodic closing of said effluent line and nominal raising of the liquid level within the clarifier is effective to lift the scum so that it overflows into the scum trough from which it is then discharged.

7. The clarifier of claim 6 wherein the scum trough and the overflow launder are adjoining and include a common upright circular wall therebetween which extends upwardly above the liquid level when raised for scum removal.

8. In a sewage treatment plant of the type which includes a clarifier and several concentric surrounding aeration channels which are hydraulically interconnected, said clarifier having
   1. a circular outer wall forming the inner wall of the innermost channel and having a steep conical bottom defining a lower sludge collection zone,
   2. a sludge return line from the lowermost portion of said zone,
   3. a circular overflow launder which establishes the normal liquid level within the channels and the clarifier and which includes a valve-controlled effluent line from said launder,
   4. a circular scum trough between said launder and said wall at an elevation above said liquid level and spaced from said wall and having a withdrawal pipe from said trough,
   5. a frusto-conical baffle extending downwardly and inwardly from said trough and toward said zone, and
   6. a circular series of submerged ports in said wall and opening generally in the direction of said baffle, the underside of said baffle and said wall defining therebetween a scum collection zone above said ports and a scum and sludge separation and flow distribution zone below said ports, the tank volume above said baffle being the clarification zone of the clarifier, said scum trough being disposed so that periodic closing of said effluent line and nominal raising of the liquid level within the plant is effective to lift the scum so that it overflows into the scum trough from which it is then discharged, the spacing of the scum trough from the wall providing a minimum exposed surface area of the scum between the wall and the trough so that there is substantially no dried and caked scum which would interfere with such periodic scum removal.

9. The plant of claim 8 wherein the elevation of the baffle and scum trough is adjustable and the overflow launder includes a vertically adjustable weir.

10. The plant of claim 8 wherein said channels and the clarifier are hydraulically interconnected so that upon closing said effluent line the liquid level in the plant is raised at a relatively slow rate whereby the overflow of the scum is readily regulated.

* * * * *